(12) United States Patent
Jones

(10) Patent No.: US 6,478,469 B1
(45) Date of Patent: Nov. 12, 2002

(54) VELOCITY VARIANCE REDUCING MULTIPLE BEARING ARRANGEMENT FOR IMPELLER SHAFT OF CENTRIFUGAL SUPERCHARGER

(75) Inventor: Daniel W. Jones, Lenexa, KS (US)

(73) Assignee: Accessible Technologies, Inc.

( * ) Notice: Subject to any disclaimer, the term of this patent is extended or adjusted under 35 U.S.C. 154(b) by 0 days.

(21) Appl. No.: 09/706,007

(22) Filed: Nov. 3, 2000

(51) Int. Cl.$^7$ .......................... F16C 19/55; F02B 33/00
(52) U.S. Cl. ........................ 384/461; 123/559.1
(58) Field of Search ..................... 384/461; 123/559.1

(56) References Cited

U.S. PATENT DOCUMENTS

| | | | | |
|---|---|---|---|---|
| 596,310 A | * | 12/1897 | Thomas | 384/461 |
| 862,679 A | * | 8/1907 | Thames | 384/515 |
| 1,433,014 A | * | 10/1922 | Kennedy | 384/461 |
| 1,506,856 A | * | 9/1924 | McCluskey | 384/461 |
| 1,539,702 A | * | 5/1925 | Szuba | 384/461 |
| 2,822,225 A | * | 2/1958 | Teufel | 384/461 |
| 3,597,029 A | * | 8/1971 | Marcum | 384/461 |
| 3,737,202 A | * | 6/1973 | Rosales | 384/461 |
| 5,138,477 A | * | 8/1992 | Omura et al. | 384/461 |
| 5,224,459 A | | 7/1993 | Middlebrook | 123/559.1 |
| 5,887,576 A | | 3/1999 | Wheeler, Jr. et al. | 123/559.1 |

OTHER PUBLICATIONS

Accessible Technologies, Inc. Owner's Manual entitled "1986–1993 Ford Mustang (CARB EO #D–365) ProCharger Blown +Intercooled Centrifugal Supercharger Systems" (1997).

Accessible Technologies, Inc. brochure entitled "ProCharger Centrifugal Supercharger Systems" (published at least as early as Jun., 1997).

* cited by examiner

*Primary Examiner*—Thomas R. Hannon
(74) *Attorney, Agent, or Firm*—Hovey Williams LLP

(57) ABSTRACT

A centrifugal supercharger includes a case, a rotatable impeller, a high speed shaft drivingly coupled between the impeller and the engine, and a multiple bearing arrangement rotatably supporting the shaft on the case. The bearing arrangement includes a shaft bearing and a case bearing, each of which includes at least one set of relatively rotatable inner and outer races. The inner race of the shaft bearing is fixed relative to the shaft. The outer race of the case bearing is fixed relative to the case. The outer race of the shaft bearing and inner race of the case bearing are fixed relative to one another either by a spacer or by an integral, unitary construction. In addition, at least one of the bearings can include dual components (inner and outer races and ball rings). The ball rings of the shaft and case bearings can be coplanar to one an other or offset therefrom.

52 Claims, 4 Drawing Sheets

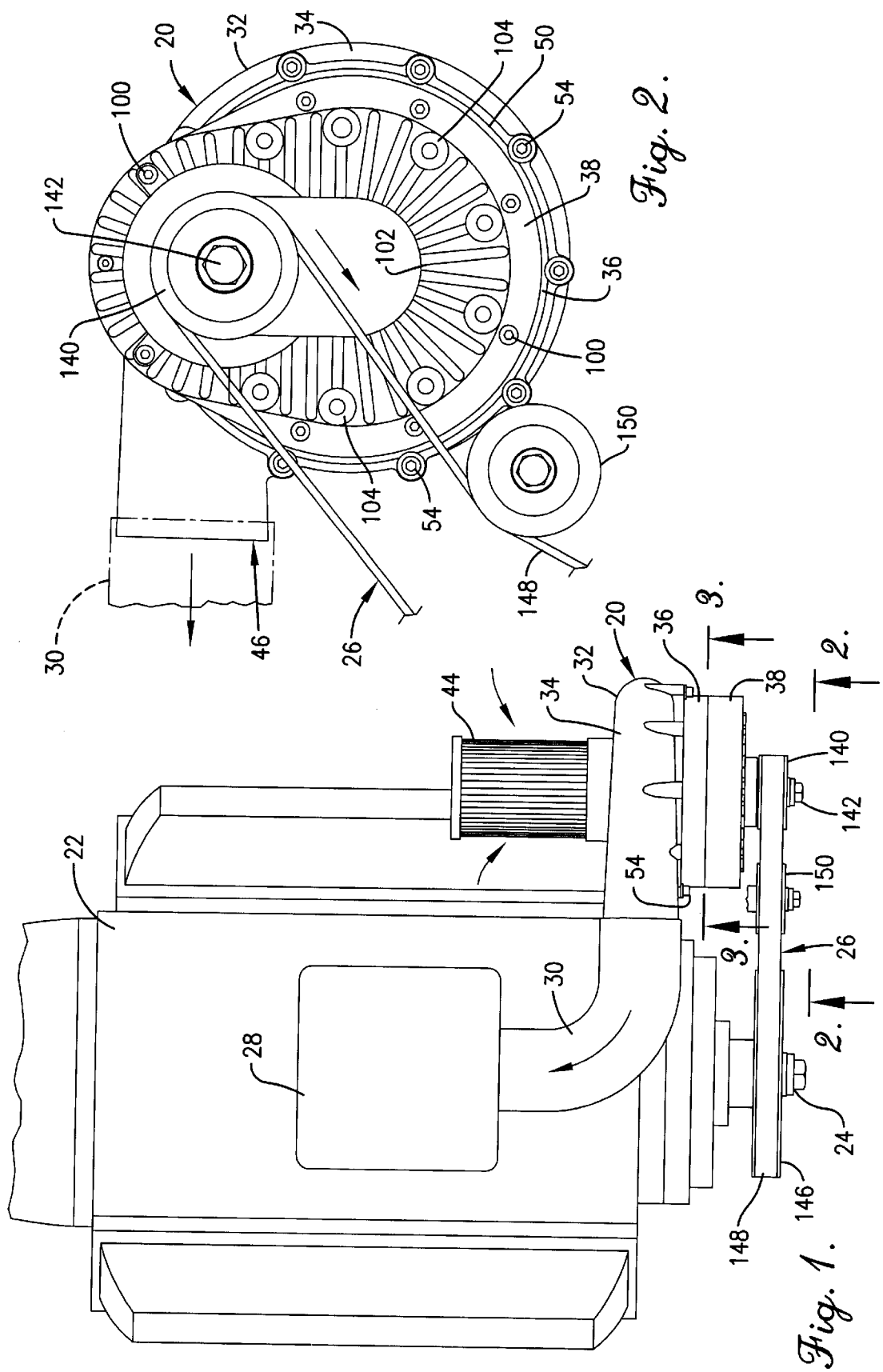

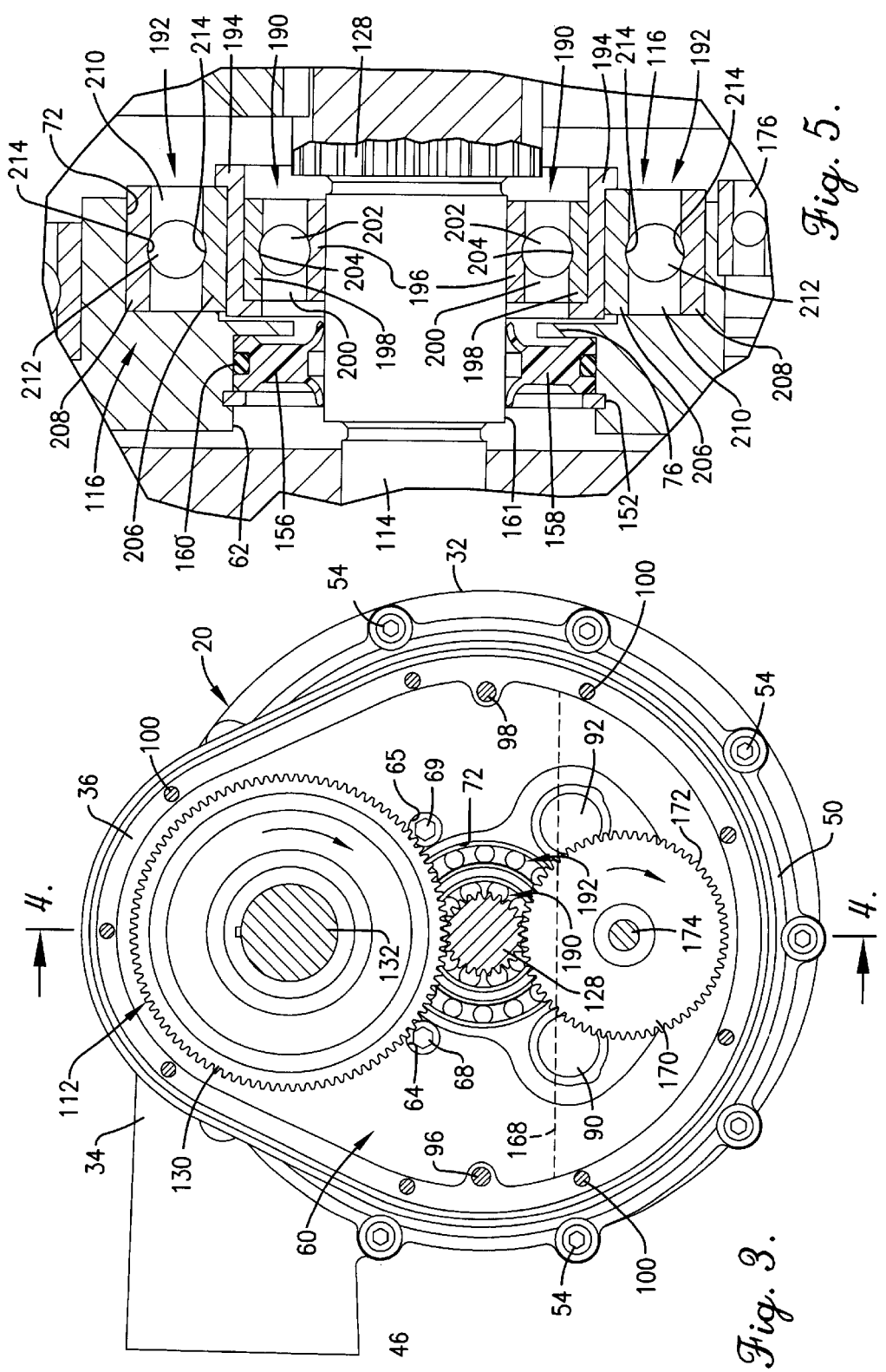

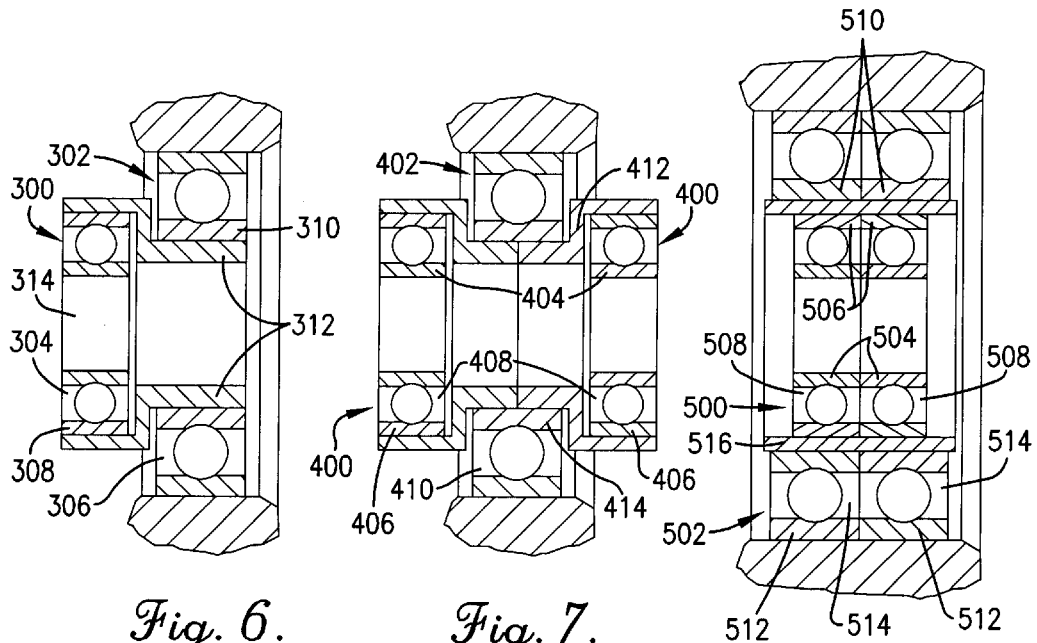
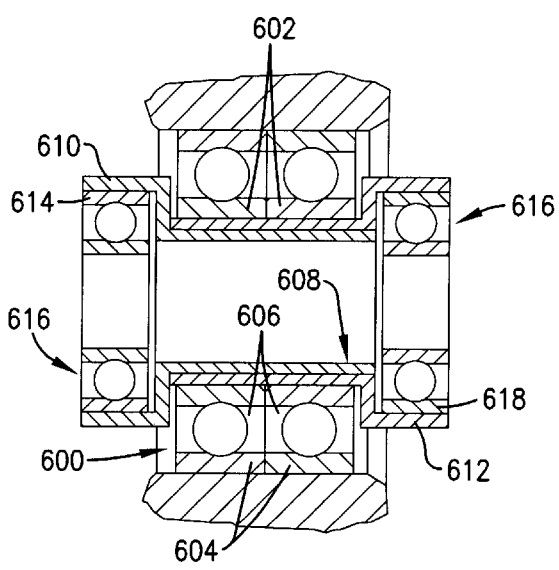

VELOCITY VARIANCE REDUCING MULTIPLE BEARING ARRANGEMENT FOR IMPELLER SHAFT OF CENTRIFUGAL SUPERCHARGER

BACKGROUND OF THE INVENTION

1. Field of the Invention

The present invention relates generally to centrifugal superchargers for providing increased airflow to an engine. More particularly, the present invention concerns a velocity variance reducing multiple bearing arrangement for effectively rotatably supporting the high speed impeller shaft of a supercharger, thereby extending bearing life without compromising shaft speed.

2. Discussion of Prior Art

A centrifugal supercharger traditionally has a high speed impeller shaft rotatably supported on the supercharger by two, spaced apart, ball bearings. Given the high rotational speeds of the impeller shaft, commercially available bearings are typically not rated high enough to withstand the demands of a supercharger. Accordingly, the bearing will be operating outside of its manufacturer recommended limits. That is, there is a substantial risk of bearing failure, thereby limiting the overall life span of the supercharger.

In response to this undesired limiting risk, some superchargers utilize paired bearings, i.e. two bearings located in close proximity to one another relative to the shaft, (four total bearings) in place of the single bearings, with each pair spaced apart from the other pair. This, however, only offers redundancy and while this may offer some slight increase in bearing life, it is still limiting. This paired arrangement also has the added disadvantage of a cumulative tolerance effect, or too much "slop" for many high precision applications.

OBJECTS AND SUMMARY OF THE INVENTION

Responsive to these and other problems, an important object of the present invention is to provide a supercharger that is capable of providing relatively high amounts of airflow (e.g., 1800 gasoline horsepower). It is also an important object of the present invention to provide a supercharger that has improved durability yet maintains a high load capacity relative to conventional superchargers. In this regard, an important object of the present invention is to provide a long-life bearing arrangement for a supercharger capable of generating the desired horsepower increases. in addition, an important object of the present invention is to provide a bearing arrangement that has virtually no limiting effect on the boost provided by the supercharger. Another important object of the present invention is to provide a supercharger having a bearing arrangement that assuredly provides sufficient and effective rotatable support to the high speed impeller shaft. Yet another important object of the present invention is to provide a supercharger having a durable, simple and inexpensive construction.

In accordance with these and other objects evident from the following description of the preferred embodiments, the present invention concerns a supercharger having a case, a rotatable impeller, a high speed shaft drivingly coupled between the impeller and a power source, and a multiple bearing arrangement rotatably supporting the shaft on the case. The bearing arrangement includes a shaft bearing and a case bearing, each of which includes relatively rotatable inner and outer races. The inner race of the shaft bearing is fixed relative to the shaft. The outer race of the case bearing is fixed relative to the case. The outer race of the shaft bearing and inner race of the case bearing are fixed relative to one another. It is believed that such an arrangement reduces the variances in the velocities of the positive contact points of the bearings, thereby reducing skidding, maximizing both load and speed, and increasing bearing life. In this manner the present invention provides a supercharger having improved bearing life and same or equal horsepower capacity, while permitting the use of relatively traditional bearings that have been simply and inexpensively modified.

The present invention also involves the use of this bearing arrangement in other applications.

Other aspects and advantages of the present invention will be apparent from the following detailed description of the preferred embodiment and the accompanying drawing figures.

BRIEF DESCRIPTION OF THE DRAWING FIGURES

Several embodiments of the invention are described in detail below with reference to the attached drawing figures, wherein:

FIG. 1 is a fragmentary, partially schematic plan view of an internal combustion engine including a centrifugal supercharger constructed in accordance with the principles of the present invention;

FIG. 2 is an enlarged, fragmentary front elevational view of the engine taken along line 2—2 of FIG. 1;

FIG. 3 is an enlarged cross-sectional view of the supercharger taken generally along line 3—3 of FIG. 1, particularly illustrating the transmission chamber and the components located therein;

FIG. 5 is a greatly enlarged, fragmentary cross-sectional view of the impeller shaft and one of the multiple bearing arrangements;

FIG. 6 is an enlarged, fragmentary cross-sectional view of an alternative embodiment of the present invention, wherein the ball ring planes are offset relative to one another and the exterior dimension of the shaft bearing is greater than the interior dimension of the case bearing inner race;

FIG. 7 is an enlarged, fragmentary cross-sectional view of a third embodiment of the present invention, wherein the shaft bearing has dual inner and outer races spaced apart from each other and the case bearing is located between the dual races;

FIG. 8 is an enlarged, fragmentary cross-sectional view of a fourth embodiment of the present invention, wherein both the shaft and case bearings has dual races and each ball ring of the shaft bearing is generally coplaner with a respective one of the ball rings of the case bearing;

Figure 4:
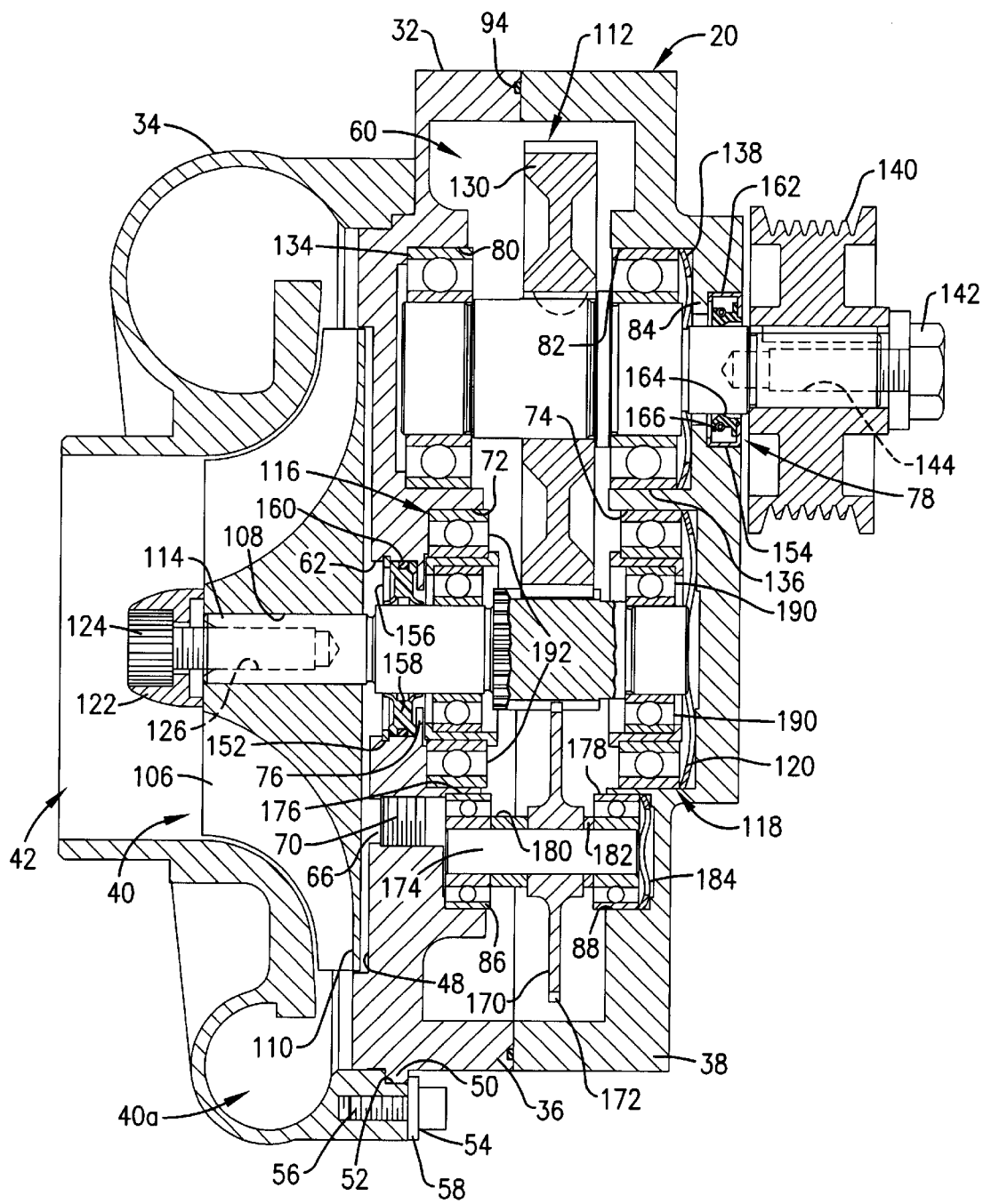
FIG. 4 is an even further enlarged cross-sectional view of the supercharger taken generally along line 4—4 of FIG. 3, particularly illustrating the multiple bearing arrangements supporting the impeller shaft.

FIG. 9 is an enlarged, fragmentary cross-sectional view of a fifth embodiment of the present invention, which is similar to the embodiment shown in FIG. 7 in the sense that the shaft bearings have dual races, and present an external dimension larger than the internal dimension of the case bearing, however, the shaft bearings are located on opposite sides of the case bearing; and FIG. 10 is an enlarged, fragmentary cross-sectional view of a sixth embodiment of the present invention, wherein the outer race of the shaft bearing and the inner race of the case bearing are integrally formed as a unitary body.

DETAILED DESCRIPTION OF THE PREFERRED EMBODIMENT

Turning initially to FIG. 1, the supercharger 20 selected for illustration is shown in use with an internal combustion engine 22 of a vehicle such as a boat or automobile. Although the illustrated engine 22 has eight cylinders, the principles of the present invention are equally applicable to various other types of engines. It is noted, however, that the supercharger 20 is preferably driven directly by the engine 22, with the crankshaft 24 and a belt drive 26 providing driving power to the supercharger 20. Moreover, the supercharger 20 is connected to the engine intake 28 (e.g., an intake plenum box) by a conduit 30, such that pressurized air generated by the supercharger 20 is directed to the intake 28. Again, the principles of the present invention are not limited to the illustrated application, but rather the inventive supercharger 20 may be associated with any system in which a highly pressurized air stream is desired. For example, it is entirely within the ambit of the present invention to utilize the supercharger 20 in various other types of reciprocating engines.

The illustrated supercharger 20 includes a case 32 that defines compressor and transmission chambers as identified hereinbelow. As perhaps best shown in FIG. 4, the preferred case 32 generally includes three main sections 34,36,38 that are formed of any suitable material (e.g., polished cast steel) and interconnected as will be described.

The case sections 34 and 36 cooperate to define a compressor chamber 40 in which incoming fluid (e.g., air, air/fuel mixture, etc.) is pressurized and accelerated. The case section 34 presents a central inlet opening 42 (see FIG. 4) through which fluid enters the chamber 40. A filter 44 (see FIG. 1) is preferably provided at the inlet opening 42, as shown, or somewhere upstream from the opening 42. Although not illustrated, the inlet opening 42 may alternatively communicate with a forwardly open conduit (not shown) that extends toward the front of the powered vehicle, such that air flow to the supercharger 20 is facilitated when the vehicle is moving in a forward direction. The case section 34 is configured in such a manner that a portion 40a of the compressor chamber 40 extends circumferentially around the inlet opening 42 to form a volute of progressively increasing diameter. The volute portion 40a of the compressor chamber 40 terminates at a tangential outlet opening 46 (see FIGS. 2 and 3), with the latter communicating with the engine intake 28 via conduit 30 (see also FIG. 1). In this regard, fluid entering the illustrated compressor chamber 40 flows axially through the inlet opening 42, is propelled generally radially into the volute portion 40a, and then directed along a generally circular path to the outlet opening 46.

As shown in FIG. 4, the case section 36 presents a circular recess 48 for purposes which will be described. In addition, the section 36 presents an outwardly projecting lip 50 that extends partly around the perimeter thereof (e.g., see FIGS. 2 and 4). The lip 50 is received in a complemental groove 52 defined in the case section 34, and a plurality of fastener assemblies 54 serve to secure the case sections 34 and 36 to one another. As particularly shown in FIG. 4, each of the fastener assemblies 54 preferably includes a threaded screw 56 received in the case section 34 and a washer 58 pressed against the lip 50.

The middle case section 36 also cooperates with the case section 38 to define a transmission chamber 60 (see FIGS. 3 and 4). As particularly shown in FIG. 3, the transmission chamber 60 is preferably teardrop shaped, with the bottom being wider than the top. An impeller shaft opening 62 that is concentric with the inlet opening 42 extends through the case section 36 from the compressor chamber 40 to the transmission chamber 60. A set of internally threaded passageways 64,65,66 also extend through the case section 36, with each of the passageways 64,65,66 normally being sealed by a respective threaded plug 68,69,70. Except for the shaft opening 62 and the passageways 64,65,66, the chambers 40 and 60 are otherwise separated from one another by the case section 36. Defined in the case sections 36 and 38 in axial alignment with the shaft opening 62 are a pair of opposed bearing assembly sockets 72 and 74. An inwardly projecting dividing wall 76 is located along the shaft opening 62 to present a seal recess for purposes which will be described.

The case section 38 similarly includes an input shaft opening 78 that is spaced upwardly from the bearing assembly socket 74. Similar to the impeller shaft opening 62, the input shaft opening 78 is axially aligned with opposed bearing assembly sockets 80 and 82 defined in the case sections 36 and 38. There is likewise an inwardly projecting dividing wall 84 alongside the bearing assembly socket 82 to present a seal recess as will be described. In the preferred embodiment, a pair of opposed, relatively small bearing assembly sockets 86 and 88 defined in the case sections 36 and 38 are utilized, although two additional pairs of sockets 90 and 92 (only the sockets defined in the case section 36 being shown in FIG. 3) are provided in the transmission chamber 60. The three pairs of sockets permit the supercharger to be mounted at various angles, while ensuring sufficient and effective dispersion of lubrication fluid within the transmission chamber 60. It is noted that the passageway 66 projects from the center socket 86 (see FIG. 4).

An endless O-ring 94 retained within a continuous groove defined in the case section 36 provides a seal between the case sections 36 and 38 (see FIG. 4). A pair of alignment rods 96 and 98 (see FIG. 3) ensure proper positioning of the case sections 36 and 38 relative to one another, as well as a series of attachment screws 100 (see also FIG. 2).

As particularly shown in FIG. 2, the illustrated case section 38 presents a finned outer face 102 for promoting heat exchange between the transmission chamber, particularly the lubrication fluid, and atmosphere. The outer face 102 is also provided with a plurality of mounting bosses 104, each being tapped so that a mounting bolt (not shown) may be threaded therein to fasten the supercharger 20 to a mounting bracket (also not shown) fixed to the engine 22.

In the usual manner, the supercharger 20 includes a rotatable impeller 106 located within the compressor chamber 40 (see FIG. 4). The impeller 106 is preferably machined from a billet of 7075 T-6 aircraft aluminum, although other suitable materials (e.g., cast aluminum) may be used. It is further preferred to use the impeller commercially available from the assignee of record of the invention claimed herein. However, the impeller 106 may be variously configured without departing from the spirit of the present invention. With respect to the preferred embodiment, the impeller 106, regardless of its design, induces and causes fluid to flow through the compressor chamber 40 as hereinabove described. It is particularly noted that the impeller 106 is provided with a central mounting hole 108. In addition, the impeller 106 has a circular, solid base 110 that spans and is received in the recess 48.

The impeller 106 is drivingly connected to the belt drive 26 of the engine 22 by a transmission 112 located generally in the transmission chamber 60. The transmission 112 may be variously configured but at least some component(s) thereof preferably require(s) continuous lubrication during operation.

As discussed in detail below, in the preferred embodiment, the transmission 112 includes an impeller shaft 114 rotatably supported by a pair of bearing assemblies 116 and 118 press fit within the respective sockets 72 and 74. In the usual manner, a wavy spring washer 120 is provided in at least one of the sockets 72 and 74. As will be described, the bearing assemblies 116 and 118 have an inventive construction that serves to extend bearing life without sacrificing speed of the shaft 114, cost or simplicity in construction.

The illustrated impeller shaft 114 projects through the opening 62 and into the compressor chamber 40. The mounting hole 108 of the impeller 106 receives the end of the shaft 114 therein, with the impeller 106 preferably being pressed onto the shaft 114 and retained thereon by a cap 122. It is noted that the cap 122 is secured in place by a screw 124 threaded into an axial bore 126 of the shaft 114. In the illustrated embodiment, the shaft 114 presents a cantilevered section (i.e., the portion of the shaft 114 projecting leftwardly beyond the bearing assembly 116 when viewing FIG. 4) on which the impeller 106 is mounted. However, it is entirely within the ambit of the present invention to alternatively support the impeller shaft 114 on both sides of the impeller 106. For example, a suitable alternative construction might involve lengthening the impeller shaft so that it projects beyond the impeller and providing a bearing assembly in the compressor chamber between the shaft and case.

When it is desired to remove the impeller 106 from the shaft 114, the outer case section 34 is detached from the middle case section 36 and the retaining screw 124 and cap 122 are removed. The plugs 68,69,70 are also unscrewed from their respective passageways 64,65,66. A tool may then be inserted through one or all of the passageways 68,69,70 to engage the impeller base 110 and force the impeller 106 off the end of the shaft 114. This might require a significant removal force because the impeller 106 is preferably press fit onto the shaft 114.

The impeller shaft 114 is preferably machined to present a pinion 128 located between the bearing assemblies 116 and 118. The pinion 128 intermeshes with a relatively larger gear 130 supported by an input shaft 132. The gear 130 is preferably keyed to the shaft 132, although these components maybe fixedly interconnected in any other suitable manner. Similar to the impeller shaft 114, a pair of bearing assemblies 134 and 136 press fit within respective ones of the sockets 80 and 82 rotatably support the input shaft 132. Additionally, a wavy spring washer 138 is provided in the socket 82 adjacent the dividing wall 84. The input shaft 132 projects through the shaft opening 78 and beyond the outer face 102 of the case section 38. The belt drive 26 includes a driven sheave 140 keyed to the outwardly projecting portion of the input shaft 132. The driven sheave 140 is further retained on the shaft 132 by a screw 142 threaded into an axial bore 144 of the shaft 132. The illustrated belt drive 26 further includes a drive sheave 146 fixed to the crank shaft 24, a belt 148 entraining the sheaves 140 and 146, and an idler sheave 150 suitably tensioning the belt 148. Thus, rotation of the crank shaft 24 effects rotation of the impeller 106.

Those ordinarily skilled in the art will appreciate that the gear-type transmission 112 of the preferred embodiment produces noise that is noticeably greater than a belt drive. It has been determined that the impeller 106 actually amplifies the noise of the transmission 112, and the noise typically associated with a gear driven supercharger is normally considered undesirable. In this regard, the impeller shaft 114 may be designed to dampen noise that might otherwise propagate through the shaft 114 to the impeller 106. Such a shaft construction is disclosed in filed application for U.S. patent Ser. No. 09/669,018, Filed Sep. 22, 2000, entitled GEAR DRIVEN SUPERCHARGER HAVING NOISE REDUCING IMPELLER SHAFT, which is hereby incorporated by reference herein as is necessary for a full and complete understanding of the present invention.

The pinion 128 is significantly smaller than the drive gear 130 so that the transmission provides a significant step up in rotational speed between the input shaft 132 and impeller shaft 114. For example, during regular operation of the supercharger 20, the illustrated shaft 114 and pinion 128 will reach speeds of up to 30,000 to 70,000 rpm. A suitable pinion 128 diameter is approximately 1.2 inches, with the drive gear 130 being about three times that size.

Because lubrication fluid will be dispersed throughout the transmission chamber 60 in the manner described below, seal assemblies 152 and 154 are provided at the shaft openings 62 and 78, respectively. Turning first to the impeller shaft seal assembly 152, a retaining ring 156 maintains a seal 158 against the dividing wall 76. The seal 158 is provided with a circumferential O-ring 160 that sealingly engages the case section 34. The seal 158 is formed of any suitable material, such as that available under the designation "TEFLON", and preferably provides double or redundant sealing contact with a seal surface 161 of the impeller shaft 114. On the other hand, the input shaft seal assembly 154 includes a metal case 162 press fit within the case section 38 against the dividing wall 84. The case 162 houses a rubber seal 164 that is sealingly retained between the input shaft 132 and case 162 by a spring 166. The illustrated seal assemblies 152 and 154 are preferred but shall be considered as illustrative only, and the principles of the present invention are equally applicable to a supercharger using various other types of seals.

A lubricant slinging disc 170 projects into the reservoir portion so as to be partly submerged in the lubricant. The illustrated disc 170 includes an outer toothed edge 172 that intermeshes with the pinion 128 so that the disc 170 is rotated by the transmission 112. Such an arrangement is disclosed in filed application for U.S. patent Ser. No. 09/668,223, Filed Sep. 22, 2000, entitled CENTRIFUGAL SUPERCHARGER HAVING LUBRICATING SLINGER, which is hereby incorporated by reference herein as is necessary for a full and complete understanding of the present invention. As shown in FIG. 4, the disc 120 is suitably fixed (i.e., press fit) to a shaft 174 and positioned between a pair of bearing assemblies 176 and 178 by respective spacers 180 and 182. The bearing assemblies 176 and 178 are press fit within respective ones of the sockets 86 and 88 and thereby serve to rotatably support the shaft 174 and disc 170 within the transmission chamber 60. As with the other shaft assemblies, a wavy spring washer 184 is provided in the socket 88 adjacent the bearing assembly 178.

As noted in the incorporated application, the disc 170 creates a highly desirable lubricating mist within the transmission chamber 60. The mist ensures that the transmission components (i.e., the gears 128,130 and the bearing assemblies 116,118,134,136) are adequately lubricated without creating undesirable hydraulic separation forces.

However, the principles of the present invention are equally applicable to various other supercharger lubrication systems. That is, the present invention is preferably utilized with a self-contained supercharger having a partly filled transmission chamber, although the inventive features can be employed in a supercharger using an outside lubrication source or a supercharger having a fully filled transmission chamber. For example, it is entirely within the ambit of the present invention to lubricate the transmission with engine lubricant or a recirculating lubrication system dedicated to the supercharger. The alternative supercharger may also include wicks or jet sprayers, rather than the slinging disc 170, for directing lubricant to the transmission components.

It is again noted, however, that the illustrated lubrication system is most preferred because a failure of the transmission 112 (e.g., metal fragments produced by broken gear teeth, shaft failures, etc.) do not damage the engine 20. It is further noted that any one of the bearing assemblies 116, 118,134,136,176,178 maybe pre-lubricated such that lubrication during operation is unnecessary.

Those ordinarily skilled in the art will appreciate that because the shaft 114 is required to rotate at extremely high speeds in order to produce the desired boost, achieving effective, durable rotational support for the shaft 114 is problematic. The specified limits of ball bearing assemblies are commonly exceeded in conventional supercharger applications thereby greatly increasing the risk of premature bearing fatigue and a reduced life span of the supercharger.

Responsive to these problems, the present invention utilizes a multiple bearing arrangement in each of the bearing assemblies 116 and 118. It will be appreciated that the bearing assemblies 116 and 118 are virtually mirror images of one another.e Thus, for the sake of brevity, only the assembly 116 received in the socket 72 will be detailedly described herein with the understanding that the assembly 118 is similarly constructed. The multiple bearing arrangement includes a shaft bearing 190 and a case bearing 192. As illustrated, each of the bearings 190 and 192 may essentially comprise a standard ball bearing assembly. The bearings 190 and 192 are staged, i.e. arranged to share the responsibility of rotatably supporting the shaft 114 on the case sections 36 and 38. That is to say, the bearings 190 and 192 are intercoupled by a spacer 194 in such a manner that the entire velocity variance between the shaft 114 and case 32 (e.g., 350 ft./sec vs. the relatively stationary case) is shared by two bearing assemblies. It is believed that this configuration maintains the variable velocities of the bearing components within each bearing in tolerable ranges, even though the overall velocity variance between the shaft and the case are above most bearing assembly operational limitations.

Turning now to FIG. 5, the shaft bearing 190 includes an inner race 196. The inner race 196 is fixed relative to the shaft 114. The inner race 196 must be dimensioned to allow the shaft bearing 190 to be press fit onto the journal portion of the shaft 114. In the preferred embodiment the inner race 196 is cylindrical in shape, matching the cylindrical shape of the journal portion of the shaft 114. The inside diameter of the inner race 196 is just slightly greater than the outside diameter of the journal portion of the shaft 114. The inner race 196 of the shaft bearing 190 could be any size and shape so long as it sufficiently matches the shape and size of the journal portion of the shaft 114 to allow the inner race 196 to be fixed relative to the shaft 114. The inner race 196 must also be configured to allow cooperation with the other components of the bearing assembly 116 to provide adequate rotational support of the shaft 114. Although the preferred embodiment utilizes a press fit as the means to fix the inner race 196 relative to the shaft 114, any method of sufficiently affixing the inner race 196 to the shaft 114 could be implemented (e.g., the inner race could alternatively be machined as an integral part of the shaft).

The shaft bearing 190 further includes an outer race 198. The outer race 198 matches the shape of the inner race 196 and in the preferred embodiment is cylindrically shaped. In the preferred embodiment, the diameter of the outer race 198 is greater than the diameter of the inner race 196 and is defined in the same radial plane relative to the shaft. The diameter of the outer race 196 defines an exterior dimension for the shaft bearing 190, the relevance of which will become apparent as discussed below. However, the terms "inner" and "outer" as used herein to describe the preferred embodiment were selected to facilitate clarity of the description and do not necessarily describe relative radial positions. For example, it is well within the ambit of the present invention that the inner and outer races could be configured so that the inner race is positioned, or at least a portion thereof, radially outward (relative to rotational axis of the shaft) from part or all of the outer race.

Interposed between the inner race 196 and the outer race 198 is shaft bearing ball ring 200. The ball ring 200 includes shaft bearing balls 202 and a shaft bearing cage (not shown). Each of the races 196 and 198 includes a curvilinear groove 204, with the grooves 204 cooperatively defining a circular opening in which the ring 200 is received. The inner race 196 and outer race 198 must be dimensioned to allow the balls 202 to contact the inner race 196 and the outer race 198 along the grooves 204 for rotational support of the shaft 114. The balls 202 run in the curvilinear grooves 204 of the races 196 and 198 and generally define a radial plane relative to the shaft 114. The cage is configured to separate the balls 202 and maintain even spacing between the balls 202 in order to prevent the balls 202 from touching one another. The balls 202 and races 196 and 198 can be constructed of any material that provides the desired rotational support of the shaft 114, rotational speed and bearing life, for example high-carbon chromium steel 52100 heat treated to high strength and hardness and smoothly ground and polished.

Similar to the shaft bearing 190, the case bearing 192 includes inner race 206, outer race 208 and ball ring 210 interposed between the inner race 206 and the outer race 208. Subject to the differences described below, the case bearing inner and outer races 206 and 208 and the ball ring 210 are configured in the same manner as the shaft bearing inner and outer races 196 and 198 and the ball ring 200. That is to say, the case bearing ball ring 210 includes case bearing balls 212 that run in curvilinear grooves 214 of the races 206 and 208 and generally define a radial plane relative to the shaft 114. Although not shown, the case bearing ball ring 210 also includes a cage for separating the balls 212. In the preferred embodiment, the races 206 and 208 are cylindrically shaped with the diameter of the outer race 208 being greater than the diameter of the inner race 206. In the preferred embodiment, the radii of the case bearing balls 212 are greater than the radii of the shaft bearing balls 202, although the principles of the present invention are not limited to this size relationship.

The case bearing inner race 206 is fixed relative to the shaft bearing outer race 198. In the preferred embodiment, the case bearing inner race 206 and shaft bearing outer race are fixed to the spacer 194 (see FIG. 5). The spacer 194 has a tubular configuration, dimensioned to fit contiguously between the inner race 206 of the case bearing 192 and the outer race 198 of the shaft bearing 190. One advantage of utilizing the spacer 194 is that it allows common commercially manufactured bearings to be used for the shaft bearing 190 and the case bearing 192. That is to say, these bearings do not have to be specially manufactured to specification, but rather the spacer 194 need only be machined and dimensioned to accommodate the pre-manufactured dimensions of the shaft bearing 190 and the case bearing 192. The diameter of the case bearing inner races 206 defines an interior dimension. In the preferred embodiment, the interior dimension of the case bearing 192 is greater than the exterior dimension of the shaft bearing 190. In addition, in the preferred embodiment, the radial planes defined by the shaft bearing ball ring 200 and the case bearing ball ring 210 are coplanar (see FIG. 5). That is to say, the shaft bearing 190 and the case bearing 192 are concentrically positioned relative to one another. In this way, the spacer 194 can be dimensioned to allow common commercially available ball bearings to be fixed together relatively easily and inexpensively. As will become apparent from the discussion below, neither the relative sizes of the interior and exterior dimensions, the use of a separate spacer 194, nor the coplanar configuration of the ball rings 200 and 210 are critical to the present invention, and these features could take on many different configurations.

The case bearing outer race 208 is fixed relative to the case 32. It is believed this staged bearing arrangement—i.e. the inner race 196 of the shaft bearing 190 fixed relative to the shaft 114, the outer race 208 of the case bearing 192 fixed relative to the case 32 and the outer race 198 of the shaft bearing 190 fixed relative to the inner race 206 of the case bearing 192—provides the bearing assembly 116 with overall synergistic benefits that either a single bearing or unstaged bearing combinations cannot provide. That is to say, it is believed that the exploitation of any one advantage in a single bearing or unstaged combination is often limited by a similar reduction of another advantage. That is, exploiting a beneficial design characteristic in a traditional single bearing or unstaged bearing combination typically involves another beneficial design characteristic to be sacrificed. In the staged bearing arrangement, one bearing could be designed to exploit one advantage over another—for example the shaft bearing 190 could be designed to withstand a large radial load at a thrust at the expense of lowering the rotational speed at which the shaft balls 202 lose stabilization and start to skid along the pitch line. At the same time, the other bearing could be designed to take advantage of what was sacrificed in the first bearing—for example, the case bearing 192 could be designed to maintain its stabilization point at very high rotational speeds. Accordingly, the staged bearing arrangement of the previous example could both withstand a large radial load at a thrust and maintain its stabilization point at very high rotational speeds. It is further believed that this staged bearing arrangement also reduces the variances in the velocities of the balls 202 and 212 at the outer periphery—for example along the pitch line—relative to the velocity of the balls 202 and 212 at their centers. It is believed that reducing these variances also reduces the points of friction—or skidding—of the balls 202 and 212 relative to the races and cages, thereby increasing the overall life of the bearing assembly 116.

As previously discussed, the bearing assembly 118 is a virtual mirror image of the bearing assembly 116. It will be understood that the bearing assembly 118, therefore, is similarly constructed as was detailedly described above regarding the bearing assembly 116.

It is noted that the principles of the present invention are equally applicable to multiple bearing arrangements utilized to rotatably support any shaft on a stationary body and are not just limited to supercharger applications. In addition, the principles of the present invention are equally applicable to various other supercharger configurations and alternative multiple bearing arrangements. For example, the type of bearings utilized in the staged arrangement could be other than ball type bearings, including roller bearings (cylindrical or tapered), needle bearings, or journal bearings. Different types of bearings could be staged together, for example, a ball bearing staged in a journal bearing. Certain features of the bearings implemented in the staged arrangement could vary, for example, the bearings could be pre-lubricated bearings. The arrangement could utilize filling or non-filling type bearings. The bearings could also include additional features, such as self-alignment or angular contact capabilities. In addition, the number of bearings that are staged (fixed relative to one another) could include more than two. Furthermore, the configuration of the bearing arrangement could take on many different alternative forms One possible alternative to the configuration of the bearing arrangement is shown in FIG. 6. Particularly, the multiple bearing arrangement includes a shaft bearing 300 and a case bearing 302. The bearings 300 and 302 are configured very similar to the bearings 190 and 192 of the preferred embodiment. However, in this alternative embodiment the shaft bearing ball ring 304 defines a general plane that is not coplanar with the corresponding plane of the case bearing ball ring 306, but is significantly offset therefrom. In addition, the exterior dimension defined by the diameter of the outer race 308 of the shaft bearing 300 is greater than the interior dimension defined by the diameter of the inner race 310 of the case bearing 302. In this embodiment, the spacer 312 is configured to correspond to the offset positioning of the shaft bearing 300. That is to say the spacer 312 has a generally tubular shape with opposing ends of differing diametrical dimensions and a tiered circumferential surface (see FIG. 6). The spacer 312 is dimensioned to allow the case bearing 302 and spacer 312 to have an inside diameter sufficiently greater (at its smallest diametric span) than the outside diameter of the shaft 314, thereby providing the necessary clearance to mount the bearing arrangement onto the shaft 314.

A second alternative to the configuration of the bearing arrangement is shown in FIG. 7. Particularly, the multiple bearing arrangement includes a shaft bearing 400 and a case bearing 402, configured in a manner similar to the bearings 190 and 192 of the preferred embodiment. In this alternative embodiment, the shaft bearing includes dual inner races 404, dual outer races 406, and dual ball rings 408. As with the alternative embodiment shown in FIG. 6, the dual ball rings 408 each define a general plane that is offset from the corresponding plane of the case bearing ball ring 410. In this alternative embodiment, the dual inner races 404 are separated, or spaced apart from one another, and flank the case bearing 402 (see FIG. 7). That is to say the case bearing 402 is positioned between the two inner races 404. The dual outer races 406 and the dual ball rings 408 are configured in a similar, flanking orientation, relative to the case bearing 402. The spacer 412 is configured in a manner similar to the spacer 312 of the previous alternative embodiment; however, the spacer 412 has a double tiered circumferential surface corresponding to the dual outer races 406 of the shaft bearing 400 (see FIG. 7). The spacer 412 is fixed relative to both of the dual outer races 406 of the shaft bearing 400 and fixed relative to the inner race 414 of the case bearing 402.

A third alternative embodiment of the configuration of the bearing arrangement is shown in FIG. 8. In this embodiment, both the shaft bearing 500 and the case bearing 502 include dual components. That is, the shaft bearing 500 includes dual inner races 504, dual outer races 506 and dual ball rings 508. Similarly, the case bearing 502 includes dual inner races 510, dual outer races 512 and dual ball rings 514. As with the previously discussed embodiments, the inner races 504 and 510, the outer races 506 and 512, and the ball rings 508 and 514 are configured in a manner similar to the configuration of those corresponding components in the preferred embodiment. Unlike the previous alternative embodiments, however, the exterior dimension defined by the outer races 506 of the shaft bearing 500 is less than (so as to fit concentrically within) the interior dimension defined by the inner races 510 of the case bearing 502 (see FIG. 8). The shaft bearing ball rings 508 each define a plane that is generally coplanar with the plane defined by the corresponding case bearing ball ring 514 (see FIG. 8). The dual components of the case bearing 502 could also be configured in a spaced apart orientation, similar to the dual components of the shaft bearing 400 of the alternative embodiment illustrated in FIG. 7. That is to say, the multiple bearing it arrangement could be configured so the dual components of the case bearing 502 have a flanking orientation with the shaft bearing 500 positioned between the dual components of the case bearing 502. The spacer 516 has a tubular configuration similar to the spacer 194 of the preferred embodiment; however, the spacer 516 has an axial dimension greater than the axial dimension of the spacer 194 to allow the spacer 516 to be fixed relative to both of the outer races 506 of the shaft bearing 500 and to both of the inner races 510 of the case bearing 502.

A fourth alternative embodiment of the configuration of the bearing arrangement is shown in FIG. 9. This alternative embodiment has a bearing arrangement similar to the arrangement illustrated in FIG. 7; however, in this embodiment the case bearing 600 has dual inner races 602, dual outer races 604 and dual ball rings 606. The spacer 608 has a double tiered circumferential surface similar to the configuration of the spacer 412 of the embodiment illustrated in FIG. 7; however, the spacer 608 has an axial dimension greater than the axial dimension of the spacer 412 to allow the spacer 608 to be fixed relative to both of the inner races 602 of the case bearing 600. Differing from the construction of the spacers of the previously discussed embodiments, the spacer 608 has a two-piece construction. That is to say, the spacer 608 includes a first tube portion 610 and a second tube portion 612 (see FIG. 9). Each of the tube portions 610 and 612 have a single tiered circumferential surface similar to the configuration of the spacer 312 of the embodiment illustrated in FIG. 6. The first tube portion 610 is fixed relative to the first outer race 614 of the shaft bearing 616 and fixed relative to both of the dual inner races 602 of the case bearing 600 (see FIG. 9). The second tube portion 612 is fixed relative to the second outer race 618 of the shaft bearing 616. Both of the tube portions 610 and 612 are fixed relative to each other along the circumferential surfaces having the smallest tier diameter. That is to say the end of the second tube portion 612 opposing the second outer race 618 fits into the end of the first tube portion 610 opposing the first outer race 614. The exterior circumferential surface of the second tube portion 612 is fixed relative to (and contiguous with) the interior circumferential surface of the first tube portion 610.

All of the embodiments previously discussed utilize some form of a spacer that is separate and distinct from the bearings interconnect the respective components of the shaft and case bearings. However, the shaft bearing and the case bearing can also be fixed together utilizing various alternative spacer designs or directly affixing the two bearings together without implementing a spacer. One alternative design is shown in FIG. 10, wherein the race of the shaft bearing 700 and the inner race of case bearing 702 are integrally formed (e.g., machined as a unitary body 704. That is to say, the body 704 includes an inner groove 706 and an outer groove 708.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A centrifugal supercharger for supplying supercharged intake fluid to an engine; said centrifugal supercharger comprising:

a case;

a rotatable impeller operable to supercharge the intake fluid;

an impeller shaft on which the impeller is supported, said impeller shaft being drivingly connectable to a power source; and a multiple bearing arrangement rotatably supporting the impeller shaft on the case, said bearing arrangement including a shaft bearing and a case bearing, each of which includes relatively rotatable first and second races, said first race of the shaft bearing being fixed relative to the impeller shaft, said second race of the case bearing being fixed relative to the case, and said second race of the shaft bearing and first race of the case bearing being fixed relative to one another.

2. A centrifugal supercharger as claimed in claim 1, each of said bearings including a ball ring interposed between the first and second races thereof, said ball rings including a plurality of balls moveably interposed between said first and second races, and a cage associated with the balls and operable to separate the balls, said ball rings each defining a plane associated therewith.

3. A centrifugal supercharger as claimed in claim 2, said shaft bearing balls having a common diameter that is less than the common diameter of the case bearing balls.

4. A centrifugal supercharger as claimed in claim 2, said planes being coplanar.

5. A centrifugal supercharger as claimed in claim 2, said planes being offset.

6. A centrifugal supercharger as claimed in claim 1, said second race of the shaft bearing and the first race of the case bearing being integrally formed as a unitary body.

7. A centrifugal supercharger as claimed in claim 1, said bearing arrangement including a spacer fixed relative to both the second race of the shaft bearing and the first race of the case bearing.

8. A centrifugal supercharger as claimed in claim 1, said first race of the case bearing presenting an interior dimension, said second race of the shaft bearing presenting an exterior dimension that is greater than said interior dimension.

9. A centrifugal supercharger as claimed in claim 1, at least one of the bearings including an additional first race and an additional second race, said additional first race being fixed relative to the same structure as the first-mentioned first race of said at least one of the bearings, said additional second race being fixed relative to the same structure as the first-mentioned second race of said at least one of the bearings.

10. A centrifugal supercharger as claimed in claim 9, said additional races being spaced from the first-mentioned races of said at least one of the bearings, said other bearing being located between the spaced apart additional and first mentioned races.

11. A centrifugal supercharger as claimed in claim 1, each of said bearings being configured so that the first race thereof is spaced radially inward from the second race thereof.

12. A centrifugal compressor as claimed in claim 1, said impeller shaft presenting an outer surface speed at the first race of the shaft bearing of at least about 10,000 feet per minute.

13. In a powered vehicle including an engine, an improved supercharger for supplying supercharged intake fluid to the engine, said centrifugal supercharger comprising:

a case presenting a compressor chamber defined between an outlet opening connected to the engine and an inlet opening;

a rotatable impeller in the compressor chamber, with the impeller being operable to supercharge the intake fluid and force the supercharged intake fluid through the outlet opening when rotated;

an impeller shaft on which the impeller is supported, said impeller shaft being drivingly coupled to the engine; and a multiple bearing arrangement rotatably supporting the impeller shaft on the case, said bearing arrangement including a shaft bearing and a case bearing, each of which includes relatively rotatable first and second races, said first race of the shaft bearing being fixed relative to the impeller shaft, said second race of the case bearing being fixed relative to the case, and said second race of the shaft bearing and first race of the case bearing being fixed relative to one another.

14. In a powered vehicle as claimed in claim 13, each of said bearings including a ball ring interposed between the first and second races thereof, said ball rings including a plurality of balls moveably interposed between said first and second races, and a cage associated with the balls and operable to separate the balls, said ball rings each defining a plane associated therewith.

15. In a powered vehicle as claimed in claim 14, said shaft bearing balls having a common diameter that is less than the common diameter of the case bearing balls.

16. In a powered vehicle as claimed in claim 14, said planes being coplanar.

17. In a powered vehicle as claimed in claim 14, said planes being offset.

18. In a powered vehicle as claimed in claim 13, said second race of the shaft bearing and the first race of the case bearing being integrally formed as a unitary body.

19. In a powered vehicle as claimed in claim 13, said bearing arrangement including a spacer fixed relative to both the second race of the shaft bearing and the first race of the case bearing.

20. In a powered vehicle as claimed in claim 13, said first race of the case bearing presenting an interior dimension, said second race of the shaft bearing presenting an exterior dimension that is greater than said interior dimension.

21. In a powered vehicle as claimed in claim 13, at least one of the bearings including an additional first race and an additional second race, said additional first race being fixed relative to the same structure as the first-mentioned first race of said at least one of the bearings, said additional second race being fixed relative to the same structure as the first-mentioned second race of said at least one of the bearings.

22. In a powered vehicle as claimed in claim 21, said additional races being spaced from the first-mentioned races of said at least one of tie bearings, said other bearing being located between the spaced apart additional and first mentioned races.

23. In a powered vehicle as claimed in claim 13, each of said bearings being configured so that the first race thereof is spaced radially inward from the second race thereof.

24. In a powered vehicle as claimed in claim 13, said impeller shaft presenting an outer surface speed at the first race of the shaft searing of at least about 10,000 feet per minute.

25. In a powered vehicle as claimed in claim 24;

a transmission drivingly connected to the engine so as to provide driving power to the impeller, with the impeller shaft being part of the transmission; and a drive mechanism drivingly connecting the transmission to the engine, said drive mechanism and said transmission being configured to rotate the impeller shaft at said outer surface speed during operation of the engine.

26. In a powered vehicle as claimed in claim 25, said drive mechanism comprising a belt drive including a plurality of sheaves and an endless belt drivingly connecting the sheaves.

27. A centrifugal supercharger for supplying supercharged intake fluid to an engine, said centrifugal supercharger comprising:

a case;

a rotatable impeller operable to supercharge the intake fluid;

an impeller shaft including a cantilevered section on which the impeller is supported, said impeller shaft being drivingly connectable to a power source; and a compound bearing assembly rotatably supporting the impeller shaft on the case, said bearing assembly including a shaft bearing and a case bearing, each of which includes relatively rotatable first and second races, said first race of the shaft bearing being fixed relative to the impeller shaft, said second race of the case bearing being fixed relative to the case, and said second race of the shaft bearing and first race of the case bearing being fixed relative to one another.

28. A centrifugal supercharger as claimed in claim 27, each of said bearings including a ball ring interposed between the first and second races thereof, said ball rings including a plurality of balls moveably interposed between said first and second races, and a cage associated with the balls and operable to separate the balls, said ball rings each defining a plane associated therewith.

29. A centrifugal supercharger as claimed in claim 28, said shaft bearing balls having a common diameter that is less than the common diameter of the case bearing balls.

30. A centrifugal supercharger as claimed in claim 28, said planes being coplanar.

31. A centrifugal supercharger as claimed in claim 28, said planes being offset.

32. A centrifugal supercharger as claimed in claim 27, said second race of the shaft bearing and the first race of the case bearing being integrally formed as a unitary body.

33. A centrifugal supercharger as claimed in claim 27, said bearing arrangement including a spacer fixed relative to both the second race of the shaft bearing and the first race of the case bearing.

34. A centrifugal supercharger as claimed in claim 27, said first race of the case bearing presenting an interior dimension, said second race of the shaft bearing presenting an exterior dimension that is greater than said interior dimension.

35. A centrifugal supercharger as claimed in claim 27, at least one of the bearings including an additional first race and an additional second race, said additional first race being fixed relative to the same structure as the first-mentioned first race of said at least one of the bearings, said additional second race being fixed relative to the same structure as the first-mentioned second race of said at least one of the bearings.

36. A centrifugal supercharger as claimed in claim 35, said additional races being spaced from the first-mentioned races of said at least one of the bearings, said other bearing being located between the spaced apart additional and first-,mentioned races.

37. A centrifugal supercharger as claimed in claim 27, each of said bearings being configured so that the first race thereof is spaced radially inward from the second race thereof.

38. A centrifugal supercharger as claimed in claim 27, said impeller shaft presenting an outer surface speed at the first race of the shaft bearing of at least about 10,000 feet per minute.

39. In a powered vehicle including an engine, an improved supercharger for supplying supercharged intake fluid to the engine, said centrifugal supercharger comprising:

a case presenting a compressor chamber defined between an outlet opening connected to the engine and an inlet opening;

a rotatable impeller in the compressor chamber, with the impeller being operable to supercharge the intake fluid and force the supercharged intake fluid through the outlet opening when rotated;

an impeller shaft including a cantilevered section on which the impeller is supported, said impeller shaft being drivingly coupled to the engine; and a compound bearing assembly rotatably supporting the impeller shaft on the case, said bearing assembly including a shaft bearing and a case bearing, each of which includes relatively rotatable first and second races, said first race of the shaft bearing being fixed relative to the impeller shaft, said second race of the case bearing being fixed relative to the case, and said second race of the shaft bearing and first race of the case bearing being fixed relative to one another.

40. In a powered vehicle as claimed in claim 39, each of said bearings including a ball ring interposed between the first and second races thereof, said ball rings including a plurality of balls moveably interposed between said first and second races, and a cage associated with the balls and operable to separate the balls, said ball rings. each defining a plane associated therewith.

41. In a powered vehicle as claimed in claim 40, said shaft bearing balls having a common diameter that is less than the common diameter of the case bearing balls.

42. In a powered vehicle as claimed in claim 40, said planes being coplanar.

43. In a powered vehicle as claimed in claim 40, said planes being offset.

44. In a powered vehicle as claimed in claim 39, said second race of the shaft bearing and the first race of the case bearing being integrally formed as a unitary body.

45. In a powered vehicle as claimed in claim 39, said bearing arrangement including a spacer fixed relative to both the second race of the shaft bearing and the first race of the case bearing.

46. In a powered vehicle as claimed in claim 39, said first race of the case bearing presenting an interior dimension, said second race of the shaft bearing presenting an exterior dimension that is greater than said interior dimension.

47. In a powered vehicle as claimed in claim 39, at least one of the bearings including an additional first race and an additional second race, said additional first race being fixed relative to the same structure as the first-mentioned first race of said at least one of the bearings, said additional second race being fixed relative to tide same structure as the first-mentioned second race of said at least one of the bearings.

48. In a powered vehicle as claimed in claim 47, said additional races being spaced from the first-mentioned races of-said at least one of the bearings, said other bearing being located between the spaced apart additional and first-mentioned races.

49. In a powered vehicle as claimed in claim 39, each of said bearings being configured so that the first race thereof is spaced radially inward from the second race thereof.

50. In a powered vehicle as claimed in claim 39,
said impeller shaft presenting an outer surface speed at the first, race of the shaft bearing of at least about 10,000 feet per minute.

51. In a powered vehicle as claimed in claim 50,
a transmission drivingly connected to the engine so as to provide driving power to the impeller, with the impeller shaft being part of the transmission; and
a drive mechanism drivingly connecting the transmission to the engine,
said drive mechanism and said transmission being configured to rotate the impeller shaft at said outer surface speed during operation of the engine.

52. In a powered vehicle as claimed in claim 51,
said drive mechanism comprising a belt drive including a plurality of sheaves and an endless belt drivingly connecting the sheaves.

* * * * *